United States Patent [19]
White et al.

[11] Patent Number: 6,070,113
[45] Date of Patent: *May 30, 2000

[54] HYBRID VEHICLE CRASH DISCRIMINATION SYSTEM

[75] Inventors: Craig W. White, Grosse Pointe; Michael P. Bruce, Brighton; Jeffrey S. Bennett; Debra A. Rice, both of Redford, all of Mich.

[73] Assignee: Automotive Systems Laboratory, Inc., Farmington Hills, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/878,090

[22] Filed: Jun. 18, 1997

Related U.S. Application Data

[60] Provisional application No. 60/020,489, Jun. 21, 1996.

[51] Int. Cl.$^7$ .............................. B60R 22/00; E05F 15/00; G05D 1/00
[52] U.S. Cl. .............................. 701/45; 701/46; 180/271; 180/282; 280/728.1
[58] Field of Search .................................. 701/45, 46, 47; 180/268, 271, 282; 280/735, 728.1, 802; 340/436, 438; 307/9.1, 10.1

[56] References Cited

U.S. PATENT DOCUMENTS

| | | | |
|---|---|---|---|
| 3,780,314 | 12/1973 | Inose et al. | 307/121 |
| 3,889,232 | 6/1975 | Bell | 340/52 H |
| 4,166,641 | 9/1979 | Okada et al. | 280/735 |
| 4,827,091 | 5/1989 | Behr | 200/61.45 M |
| 4,836,024 | 6/1989 | Woehrl et al. | 73/514 |
| 4,922,065 | 5/1990 | Behr et al. | 200/61.45 M |
| 4,950,914 | 8/1990 | Kurihara et al. | 307/10.1 |
| 4,950,915 | 8/1990 | Spies et al. | 307/10.1 |
| 4,958,851 | 9/1990 | Behr et al. | 280/735 |
| 4,994,972 | 2/1991 | Diller | 364/424.05 |
| 5,003,190 | 3/1991 | Seiler | 307/9.1 |
| 5,040,118 | 8/1991 | Diller | 364/424.05 |
| 5,067,745 | 11/1991 | Yoshikawa | 280/735 |
| 5,081,587 | 1/1992 | Okano | 364/424.05 |
| 5,083,276 | 1/1992 | Okano et al. | 364/424.05 |
| 5,085,464 | 2/1992 | Behr et al. | 280/735 |
| 5,173,614 | 12/1992 | Woehrl et al. | 307/10.1 |
| 5,177,370 | 1/1993 | Meister | 307/10.1 |
| 5,182,459 | 1/1993 | Okano et al. | 307/10.1 |
| 5,202,831 | 4/1993 | Blackburn et al. | 364/424.05 |
| 5,225,985 | 7/1993 | Okano | 364/424.05 |
| 5,229,943 | 7/1993 | Eigler et al. | 364/424.05 |

(List continued on next page.)

OTHER PUBLICATIONS

IEEE Transactions on Vehicular Technology. vol. 44 No. 3, Syed Masud Mahmud, A New Decision Making Algorithm for Airbag Control, Aug. 1995, p. 690–697.

*Primary Examiner*—William A. Cuchlinski, Jr.
*Assistant Examiner*—Gertrude Arthur
*Attorney, Agent, or Firm*—Lyon, P.C.

[57] ABSTRACT

A vehicular crash discrimination system (10) incorporates first (12) and second (14) crash sensors operatively coupled to a logic AND gate (16), which activates a safety restraint system (2). The first crash sensor (12) is mounted in a location which for a preferred sensing characteristic causes susceptibility to activation by crashes which are so directed that the safety restraint system (2) should not otherwise be activated. The second crash sensor (14), having a lower detection threshold than the first crash sensor (12), is mounted at a distinct location and is responsive to crashes for which the safety restraint system (2) is preferably activated, but is not responsive to those crashes which cause false activation of the first crash sensor (12). The instant invention thus provides for a preferred sensing characteristic determined by a first crash sensor mounted in an inferior location without being subject to false activation of the safety restraint system (2). In another aspect, the first crash sensor (2) incorporates a plurality of crash sensing characteristics and the selection of the active sensing characteristic is dependent upon the operative state of the second crash sensor (14).

26 Claims, 5 Drawing Sheets

U.S. PATENT DOCUMENTS

| | | | |
|---|---|---|---|
| 5,234,228 | 8/1993 | Morota et al. | 280/734 |
| 5,261,694 | 11/1993 | White et al. | 280/735 |
| 5,262,949 | 11/1993 | Okano et al. | 364/424.05 |
| 5,282,134 | 1/1994 | Gioutsos et al. | 364/424.05 |
| 5,337,238 | 8/1994 | Gioutsos et al. | 364/424.05 |
| 5,338,062 | 8/1994 | Kiuchi et al. | 280/735 |
| 5,363,302 | 11/1994 | Allen et al. | 364/424.05 |
| 5,363,303 | 11/1994 | Kaneko et al. | 364/424.05 |
| 5,365,114 | 11/1994 | Tsurushima et al. | 307/10.1 |
| 5,375,468 | 12/1994 | Ohta et al. | 73/517 AV |
| 5,377,523 | 1/1995 | Ohta et al. | 73/1 D |
| 5,387,819 | 2/1995 | Ueno et al. | 307/10.1 |
| 5,389,822 | 2/1995 | Hora et al. | 307/10.1 |
| 5,390,951 | 2/1995 | Iyoda | 280/730 A |
| 5,394,326 | 2/1995 | Liu | 364/424.05 |
| 5,396,424 | 3/1995 | Moriyama et al. | 364/424.05 |
| 5,407,228 | 4/1995 | Shibata et al. | 280/735 |
| 5,416,360 | 5/1995 | Huber et al. | 307/10.1 |
| 5,422,965 | 6/1995 | Bekki et al. | 364/424.05 |
| 5,428,340 | 6/1995 | Kawabata et al. | 340/438 |
| 5,428,534 | 6/1995 | Wetzel et al. | 364/424.05 |
| 5,430,334 | 7/1995 | Meister | 307/10.1 |
| 5,433,101 | 7/1995 | Spangler et al. | 73/1 D |
| 5,440,913 | 8/1995 | Crispin et al. | 73/1 D |
| 5,485,041 | 1/1996 | Meister | 307/10.1 |
| 5,490,066 | 2/1996 | Gioutsos et al. | 364/424.05 |
| 5,495,414 | 2/1996 | Spangler et al. | 364/424.05 |
| 5,498,028 | 3/1996 | Carlin et al. | 280/735 |
| 5,506,454 | 4/1996 | Hanzawa et al. | 307/10.1 |
| 5,508,918 | 4/1996 | Gioutsos | 364/424.05 |
| 5,508,920 | 4/1996 | Gioutsos et al. | 364/424.05 |
| 5,519,613 | 5/1996 | Gioutsos et al. | 364/424.05 |
| 5,541,842 | 7/1996 | Gioutsos et al. | 364/424.05 |
| 5,563,791 | 10/1996 | Gioutsos et al. | 364/424.05 |
| 5,587,906 | 12/1996 | McIver et al. | 364/424.04 |
| 5,606,501 | 2/1997 | Gioutsos et al. | 364/424.04 |
| 5,609,358 | 3/1997 | Iyoda et al. | 280/735 |
| 5,620,203 | 4/1997 | Jeenicke et al. | 280/735 |
| 5,629,847 | 5/1997 | Shirakawa et al. | 364/424.05 |

HYBRID VEHICLE CRASH DISCRIMINATION SYSTEM

The instant application claims the benefit of prior U.S. Provisional Application Ser. No. 60/020,489, filed Jun. 21, 1996.

TECHNICAL ART

The instant invention generally relates to vehicular crash discrimination systems used to activate a safety restraint system, and more particularly to compensating for the effects of collisions from directions for which the associated safety restraint system is preferably not activated.

BACKGROUND OF THE INVENTION

A vehicle may contain safety restraint actuators which are activated in response to a vehicle crash for purposes of mitigating occupant injury. Examples of such restraint actuators include air bags, seat belt pretensioners, and deployable knee bolsters. These vehicle crashes may occur over a wide range of directions relative to the longitudinal axis of the vehicle, and the effectiveness of some restraint actuators can be directionally dependent. A particular air bag restraint system may provide the best occupant protection for collisions in one particular direction along the restraint system axis, and diminishing levels of protection as collision angles depart from the preferred direction. For example, a frontal air bag system provides the best protection for collisions which are directed along the longitudinal axis of the vehicle, while also providing protection but perhaps at a lesser degree for angular or offset crashes, with collision angle measured relative to the longitudinal axis of the vehicle. For collision angles less than 45 degrees in magnitude, the crash is primarily front directed, while for collision angles between 45 and 135 degrees in magnitude, the crash is primarily side directed, while for crashes between 135 and 180 degrees in magnitude, the crash is primarily rear directed.

Both frontal and side-impact air bag systems are well known in the art, and each system is preferably only activated for collisions within its respective range of collision angles. For example, a frontal air bag system might preferably not be activated during a side impact, and a side-impact air bag system might preferably not be activated during a frontal impact. Each such system would have an associated range of angles for which the system is preferentially deployed in the event of a crash for which the occupant might otherwise be injured.

The particular safety restraint actuator(s) which are preferably activated for a given range of crashes is referred to herein as a safety restraint system, whereby a given vehicle may contain a plurality of such safety restraint systems. For each safety restraint system in a given vehicle there is an associated set of crashes of various severity levels which are so directed as to require the activation of the safety restraint system in order to mitigate occupant injury. For the remaining crashes, the restraint system is preferentially not activated so as to minimize the risk of restraint induced injury to the occupant or to avoid unnecessary repair costs associated with the activation of the restraint system.

A safety restraint system is activated by a crash discrimination system which senses the acceleration associated with the crash and determines from the acceleration-time waveform if and when to send an activation signal to the safety restraint system. For an air bag system, this activation signal generally comprises a current of sufficient magnitude and duration to initiate an ignitor which in turn ignites the gas generant composition in an inflator to generate the gases necessary to fill the air bag. The crash discrimination system generally has a restraint sensing axis aligned with the associated restraint system axis. For example, for a frontal air bag system, the restraint system axis and the restraint sensing axis are both aligned with the longitudinal axis of the vehicle, whereas for a side-impact air bag system, the both the restraint system axis and the restraint sensing axis are perpendicular to the longitudinal axis of the vehicle. Generally, acceleration components directed along the restraint sensing axis determine the activation of the associated restraint system, although off-axis components of acceleration can sometimes be interpreted as axial components, especially if the sensor associated with the crash discrimination system is rotated in the course of the crash because of structural deformation of the vehicle.

A crash discrimination system must discriminate between crash conditions requiring restraint system activation—"ON" conditions,—and crash conditions for which the restraint system is preferentially not activated—"OFF" conditions. The borderline between these two conditions is referred as a threshold condition. Those crash conditions near the threshold for which the restraint system is preferentially not activated are referred as "threshold-OFF" conditions (e.g. 8 MPH), while those crash conditions near the threshold for which the restraint system is preferentially activated are referred as "threshold-ON" conditions.

One set of known crash discrimination systems utilizes a plurality of mechanical discrimination sensors positioned and mounted in various locations within the vehicle crush zone or the engine compartment. Each mechanical discrimination sensor generally has a characteristic damping level, which when increased, or over damped, causes the sensor to behave more like a delta-velocity switch; which when decreased, or under damped, causes the sensor to behave more like an acceleration switch. In order to prevent borderline crashes, i.e. "threshold-OFF" conditions, from activating the safety restraint system, mechanical discrimination sensors are generally overdamped, having a delta-velocity threshold in the range of 10–12 MPH, so as to prevent "threshold-OFF" conditions from activating the safety restraint system but with the associated disadvantage that the corresponding "threshold-ON" performance is variable. Generally mechanical discrimination sensors operate by closing a mechanical switch in response to an acceleration signal. U.S. Pat. No. 4,166,641 teach the combination of a crash sensor mounted in the passenger compartment with a front crash sensor to improve immunity to false activation of the front crash sensor.

In operation, any one of the plurality of mechanical discrimination sensors can activate the associated safety restraint system. Also, a safing sensor is generally placed in series with the safety restraint system to improve the noise immunity of the system, whereby to activate the safety restraint system, both any one of the mechanical discriminating sensors must be ON, and the safing sensor must be ON, where ON refers to the condition where the sensing characteristic of the sensor has exceeded its associated threshold level. In other words, the activation of the safety restraint system is given by the logical AND combination of the safing sensor with the logical OR combination of the plurality of mechanical discrimination sensors. Safing sensors typically are simply acceleration switches with a relatively low switching threshold (e.g. 1–2 G's) which is not suitable for crash discrimination because occupants could be harmed by the deployment of an air bag restraint system which might not otherwise be needed to mitigate occupant injury.

The prior art teaches mechanical discrimination sensors which are self-testable. U.S. Pat. Nos. 4,827,091, 4,922,065 and 5,430,334 teach the application of a current to an electromagnetic coil surrounding a magnetic sensing element to move the sensing element—which would otherwise move in response to a crash induced acceleration—thereby closing the mechanical switch contacts of the sensor. U.S. Pat. No. 5,485,041 teaches the use of a Hall effect or weigand wire sensor instead of mechanical switch contacts. U.S. Pat. No. 5,003,190 teaches a self-testable relay-like crash sensor. Such a self-test determines the diagnostic state of the sensor, which is either operative or inoperative. An operative sensor can be expected to properly discriminate crashes according to whether or not the safety restraint system should be activated, whereas an inoperative sensor would not be expected to provide such discrimination.

U.S. Pat. Nos. 4,827,091, 4,922,065, 5,430,334 and 5,485,041 also teach that a mechanical discrimination sensor can be reconfigured to assume a variety of different sensing characteristics by controlling the current to the electromagnetic coil surrounding or in proximity to the magnetic sensing element. For example, a safing sensor so constructed can be reconfigured to become a crash discrimination sensor. U.S. Pat. No. 5,085,464 teaches an air bag firing circuit incorporating a plurality of self-testable sensors whereby a faulty sensor is reconfigured to the open position. U.S. Pat. No. 4,958,851 teaches an air bag firing circuit incorporating first and second testable and reconfigurable crash sensors, whereby in the event of a malfunction of a crash sensor, the malfunctioning sensor is activated and if the malfunctioning sensor normally has the higher detection threshold the other crash sensor is reconfigured to have the higher detection threshold. U.S. Pat. No. 3,780,314 teaches another type of reconfigurable electromagnetic sensor, whereby the activation of first crash sensor mounted at the front of the vehicle causes the activation threshold of distinctly located second crash sensor to be lowered.

Another form of a mechanical discrimination sensor known in the art as a crush zone sensor generates a signal responsive to vehicle crush caused by the vehicle crash. These sensors are located within the crush zone of the vehicle structure associated with the set of vehicle crashes for which the safety restraint system is preferably activated. Examples of the principles by which such sensors operate include but are not limited to simple mechanical switch closure, fiber optic sensing, acceleration sensing, and magneto-restrictive sensing. U.S. Pat. No. 3,889,232 teaches the combination of a crush zone sensor with a mechanical deceleration sensor for actuating an air bag system.

Another known crash discrimination system utilizes a single point discriminating crash sensor comprising an electronic control module incorporating an accelerometer, whereby the electronic control module processes the acceleration waveform measured by the accelerometer and outputs a signal to activate the safety restraint system if selected properties of the acceleration waveform according to a sensing characteristic exceed a specific switching threshold. The sensing characteristic is typically implemented by an algorithm executed by a microprocessor in the electronic control module. This activation signal may take a variety of forms, including but not limited to a voltage level, a current level, or a switch closure. The single point discriminating crash sensor is generally mounted at a location within the vehicle from which an acceleration signal is observable for each crash within the set of crashes for which the associated restraint system should be activated. Examples of single point crash discrimination systems are found in U.S. Pat. Nos. 5,067,745, 5,365,114, 5,396,424, 5,495,414 and 5,587,906.

The prior art teaches accelerometer based crash sensors which are self-testable. U.S. Pat. Nos. 5,387,819, 5,506,454, 5,433,101 and 5,495,414 teach the use accelerometers which sense the capacitance of a moveable electrode, whereby the sensing elements may be self-tested with electrostatic deflection. U.S. Pat. Nos. 4,950,914 and 5,428,340 teach the use of piezoelectric sensing elements which are tested by use of a counter piezoelectric effect. U.S. Pat. Nos. 5,375,468 and 5,377,523 teach the use of a piezoelectric accelerometer coupled to a vibrator. U.S. Pat. No. 4,950,915 teaches the use of a piezoelectric sensing element which is tested with acoustic energy. U.S. Pat. No. 5,440,913 teaches the use of dual accelerometers which are continuously tested under normal driving conditions. U.S. Pat. Nos. 5,182,459 and 5,363,303 teaches the use of dual piezoelectric accelerometers which are each testable. U.S. Pat. Nos. 5,389,822 and 5,083,276 teach the AND combination of two acceleration sensors installed at approximately the same location. U.S. Pat. No. 5,422,965 teaches the use of plural self diagnosis algorithms to improve reliability.

Furthermore, the single point discriminating crash sensor may incorporate a safing sensor for improved reliability. U.S. Pat. No. 5,261,694 teaches that the safing sensor can be reconfigured as a crash discriminating sensor in the event that the single point discriminating crash sensor otherwise fails, whereby this reconfigurable safing sensor is co-located in a common housing with the accelerometer based discriminating crash sensor. U.S. Pat. No. 5,416,360 teaches the combination of a mechanical crash sensor with an electronic crash sensor for improved reliability. U.S. Pat. Nos. 5,338,062 and 5,428,534 teach the combination of a centrally located electronic crash sensor with lateral deformation sensors for purposes of detecting side impacts for improved crash detection and discrimination.

The prior art also teaches the use the a plurality of crash sensing algorithms in a single crash sensor, and also the use of an adaptive or variable threshold level. U.S. Pat. Nos. 4,994,972, 5,040,118 and 5,229,943 teach a plurality of algorithms which are simultaneously evaluated to provide improved crash detection. U.S. Patent teaches a plurality of algorithms which are evaluated alternately by a single CPU. U.S. Pat. Nos. 5,081,587, 5,262,949 and 5,407,228 teach a variable threshold level depending upon vehicle speed or deceleration level. U.S. Pat. No. 5,225,985 teaches the use of an adaptive reference level for discriminating the occurrence of a collision.

One advantage of the single point discriminating crash sensor in comparison with a plurality of mechanical discrimination sensors is reduced cost and simplified system configuration. However, for robust performance a single point discriminating crash sensor with an inferior sensing algorithm or mounted in an inferior location within the vehicle may require one or more redundant or auxiliary discriminating crash sensors in order to detect crashes that the algorithm otherwise would miss for which the safety restraint system is preferably deployed. A crash discrimination system incorporating such a plurality of discriminating crash sensors would then activate the safety restraint system if any one of the discriminating crash sensors detected the occurrence of crash for which the safety restraint system is preferably deployed. In other words, the signal for activating the safety restraint system is formed as the logical OR combination of the outputs from each of the constituent discriminating crash sensors.

The prior art teaches the control of activation of an air bag system on the basis of collision direction. U.S. Pat. Nos. 5,390,951 and 5,609,358 disclose systems incorporating a combination of mechanical crash sensor and accelerometer based crash sensor for detecting collision direction and magnitude upon which decisions are made to either deploy or inhibit deployment of associated plural air bag systems. U.S. Pat. Nos. 4,836,024 and 5,173,614 teach a pair of accelerometers which are angularly displaced left and right of the vehicle longitudinal axis to improve the response characteristic and to determine the impact direction. U.S. Pat. Nos. 5,202,831, 5,234,228 and 5,620,203 teach a combination of longitudinal and lateral crash sensors for detecting crash direction.

The mounting location of the single point discriminating crash sensor is a factor affecting the design of the associated sensing algorithm. The single point discriminating crash sensor is preferably located where the sensor can observe the crash signal for which the safety restraint system is preferably activated without being susceptible to erroneous crash induced signals for which the safety restraint system is preferably not activated. For example, in a frontal air bag system the associated single point discriminating crash sensor might be located in the right or left cowl or a location proximate to side-impact crush and thereby become susceptible to a side-impact crash causing an acceleration along the restraint sensing axis of the single point discriminating crash sensor so as to cause an erroneous activation of the frontal air bag system. This could occur for example if the crash deforms the structure upon which the single point discriminating crash sensor is mounted. In some cases this deficiency can be ameliorated by modification of the associated sensing algorithm, but generally only at the expense of worsened crash discrimination performance as evidenced for example by increased detection time, also known in the art as time-to-fire (TTF). Also, the single point discriminating crash sensor can be subject to false activation by certain abuse events such as objects or debris which impact the vehicle in proximity to where the sensor is located.

Generally crash discrimination systems which incorporate only mechanical discrimination sensors are not sufficiently robust to properly sense the full range of frontal crashes. Vulnerably positioned stand-alone single point discriminating crash sensors are generally unable to meet performance requirements, such as detection time, while simultaneously preventing activation from crashes for which the safety restraint system is preferably not activated. The incorporation of redundant or auxiliary discriminating crash sensors does not necessary prevent erroneous activations caused by off-axis crashes because the restraint system activation signal is formed from the logical OR combination of the outputs from each of the constituent discriminating crash sensors, so that any one sensor of the collection vulnerable to false activation could falsely activate the safety restraint system.

SUMMARY OF THE INVENTION

Accordingly, one object of the instant invention is to provide an improved crash discrimination system with reduced susceptibility to those crashes for which the safety restraint system is preferably not activated.

A further object of the instant invention is to provide an improved crash discrimination system which provides rapid detection of those crashes for which the safety restraint system is preferably activated.

A yet further object of the instant invention is to provide an improved crash discrimination system which is adaptable to failures of the constituent crash sensors so as to improve overall system reliability.

In accordance with these objectives, one feature of the instant invention is the incorporation of a first crash sensor, and a second crash sensor, whereby the sensing characteristic of the first crash sensor has a higher threshold than the sensing characteristics of the second crash sensor so that the first crash sensor is generally the discriminating crash sensor for the system.

Another feature of the instant invention is that the first crash sensor operating with the first sensing characteristic may be susceptible to activation on crashes which are so directed that the safety restraint system would otherwise preferably remain inactivated. However, with these crashes, the operative second crash sensor is generally not responsive and therefor prevents activation of the safety restraint system.

Yet another feature of the instant invention is the incorporation of a first crash sensor having a plurality of sensing characteristics, and a second crash sensor, whereby the sensing characteristics of the first crash sensor have a higher threshold than the sensing characteristics of the second crash sensor so that the first crash sensor is generally the discriminating crash sensor for the system.

Yet another feature of the instant invention is that the governing sensing characteristic of the first crash sensor is dependent upon the operative state of the second crash sensor.

Yet another feature of the instant invention is that if the second crash sensor is operative, the safety restraint system activated when both first and second crash sensors detect the crash, whereas if the second crash sensor is inoperative, the safety restraint system activated when only the first crash sensor detects the crash.

Yet another feature of the instant invention is that first sensing characteristic of the first crash sensor generally has a lower threshold and therefor provides for faster crash detection than the second sensing characteristic of the first crash sensor.

Yet another feature of the instant invention is that the first crash sensor operating with the second sensing characteristic is less susceptible to crashes which are so directed that the safety restraint system preferably remains inactivated.

The specific features of the instant invention provide a number of associated advantages. One advantage of the instant invention with respect to the prior art is improved robustness of a vehicular crash discrimination system when the discriminating crash sensor must be mounted in locations which are vulnerable to crashes which are so directed that the associated safety restraint system preferably remains inactivated.

Another advantage of the instant invention is improved reliability of a vehicular crash discrimination system by incorporation of a plurality of crash sensing characteristics in the first crash sensor which are responsive to the operative state of the second crash sensor.

Yet another advantage of the instant invention is improved reliability of a vehicular crash discrimination system resulting from bypassing the second crash sensor in the event of a malfunction thereof The instant invention overcomes the problems associated with a vulnerably located single point discriminating crash sensor by incorporating a second crash sensor which is primarily responsive to crashes for which the associated safety restraint system is preferably activated. If the second crash sensor is operative, the safety restraint system activation signal is formed as the logical AND combination of the outputs from these respective crash sensors, thereby enabling the crash sensing characteristic of the single point discriminating crash sensor to be tuned for best crash detection performance without being susceptible to causing false activations of the safety restraint system for crashes which are not within the directional range of the safety restraint system. This arrangement provides for improved system robustness. In this context, the second crash sensor can also be viewed as an auxiliary safing or arming sensor for the single point discriminating crash sensor. For the example of a frontal air bag system, the single point crash sensor provides overall crash discrimination capability to fully control safety restraint deployment, but the system relies upon the second crash sensor to prevent frontal air bag deployments due to sideimpact collisions or severe rough road events occurring proximate the mounting location of the single point discriminating crash sensor, due to severe undercarriage events, or due to abuse events.

Furthermore, a single point crash sensor used in the instant invention can incorporate fault tolerance by using a plurality of crash sensing characteristics implemented in associated crash discrimination algorithms so that for normal operation a first sensing characteristic is executed by a first algorithm, whereas in the event that the second crash sensor malfunctions, a second sensing characteristic is executed by a second algorithm, whereby the first, or nominal, sensing characteristic is tuned for best crash discrimination response, and the second, or backup, sensing characteristic is tuned to reduce susceptibility to false crash detection.

The present invention will be more fully understood after reading the following detailed description of the preferred embodiment with reference to the accompanying drawings. While this description will illustrate the application of the instant invention in a frontal air bag restraint system, it will be understood by one with ordinary skill in the art that the instant invention can also be applied to other types of restraint systems, such as for protection from side-impact, rear-impact, or roll-over collisions, such as with air bags, seat belt pretensioners, or deployable knee bolsters.

DETAILED DESCRIPTION OF THE PREFERRED EMBODIMENT(S)

Figure 1:
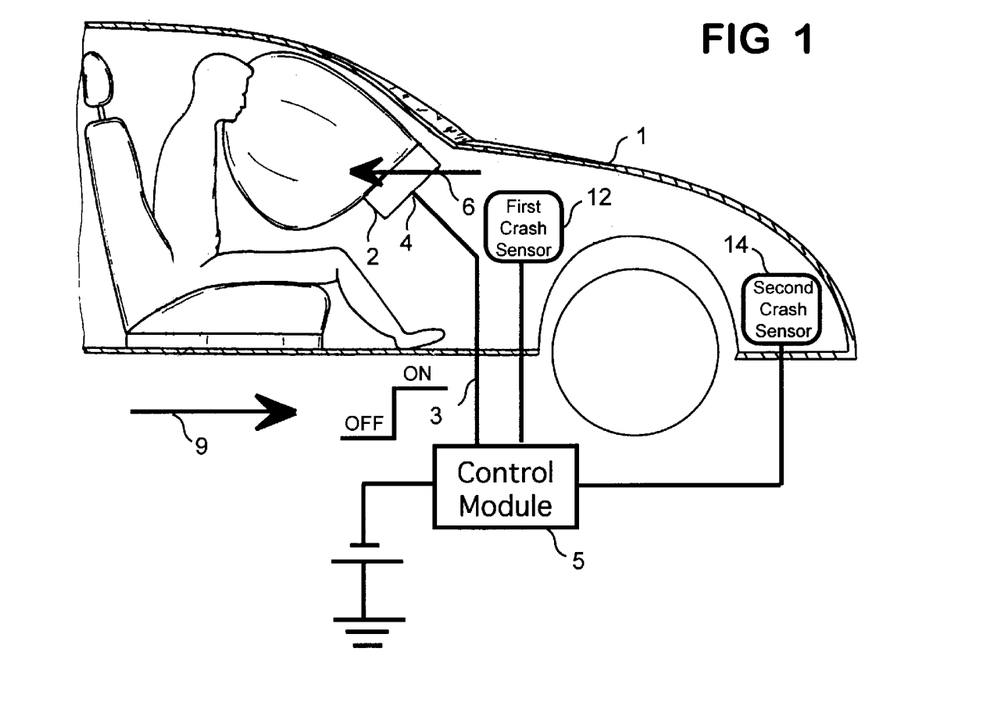
FIG. 1 illustrates the environment of the instant invention.

Referring to FIG. 1, a vehicle 1 is equipped with a safety restraint system 2 which is activated in response to an activation signal 3 applied to an activation input signal port 4 by a control module 5 incorporating first 12 and second 14 crash sensors or communicating therewith. The particular configuration or type of safety restraint system 2 is not considered to be limiting to the instant invention, although the instant invention is preferably used in conjunction with a safety restraint system 2 for which restraint performance is directionally dependent. FIG. 1 illustrates the safety restraint system 2 as a frontal air bag system having a restraint system axis 6 aligned with the longitudinal axis of the vehicle 9 and which is preferably activated in response to frontal collisions or angular collisions with a significant frontal acceleration component and of sufficient crash severity, and which might preferably remain inactivated in response to side impact collisions or angular collisions with an insignificant frontal acceleration component, or during rough road, undercarriage impact, or abuse events. The vehicle 1 can be subjected to a range of collisions of various types, magnitudes, and from various directions, such as frontal, angular, offset, side, or rear impacts, and with various objects. The range and type of collisions for which the safety restraint system 2 is preferably activated is generally dependent upon the design of the vehicle 1, particularly the passenger compartment and frontal structure. Such an activation decision may also be dependent upon the size, weight, and position of the occupant to be protected, should these characteristics be observable by the control module 5. The vehicle 1 can also be subject to other conditions such as rough roads, impacts with small objects, or vandalism for which the safety restraint system 2 preferably remains inactivated. In general, the safety restraint system 2 should not be activated unless otherwise necessary to mitigate occupant injury because of the potential for occupant harm by the safety restraint system 2 and because associated repair costs.

Figure 2:
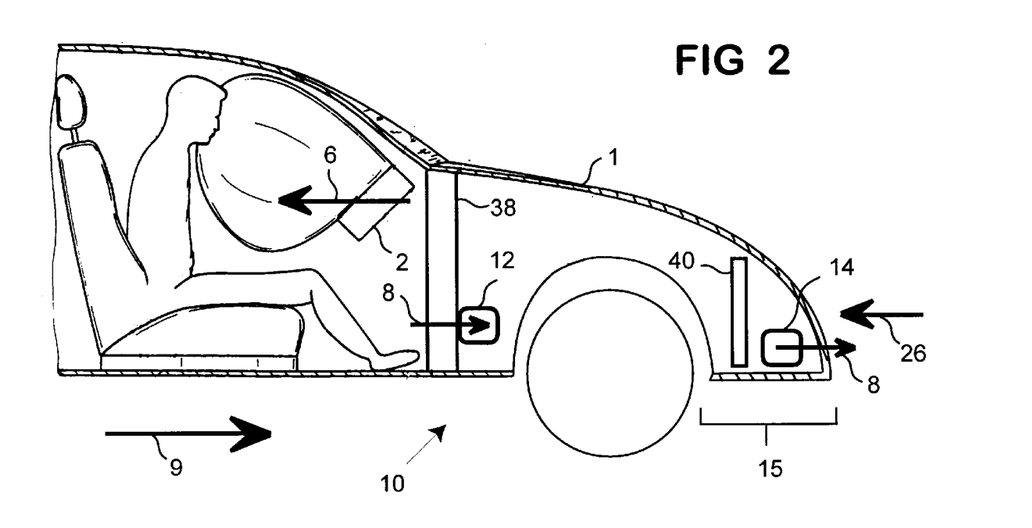
FIG. 2 is a side view of a vehicle showing a frontal single point discriminating crash sensor mounted in a location that is vulnerable to false activation from side-impact collisions.
Figure 3:
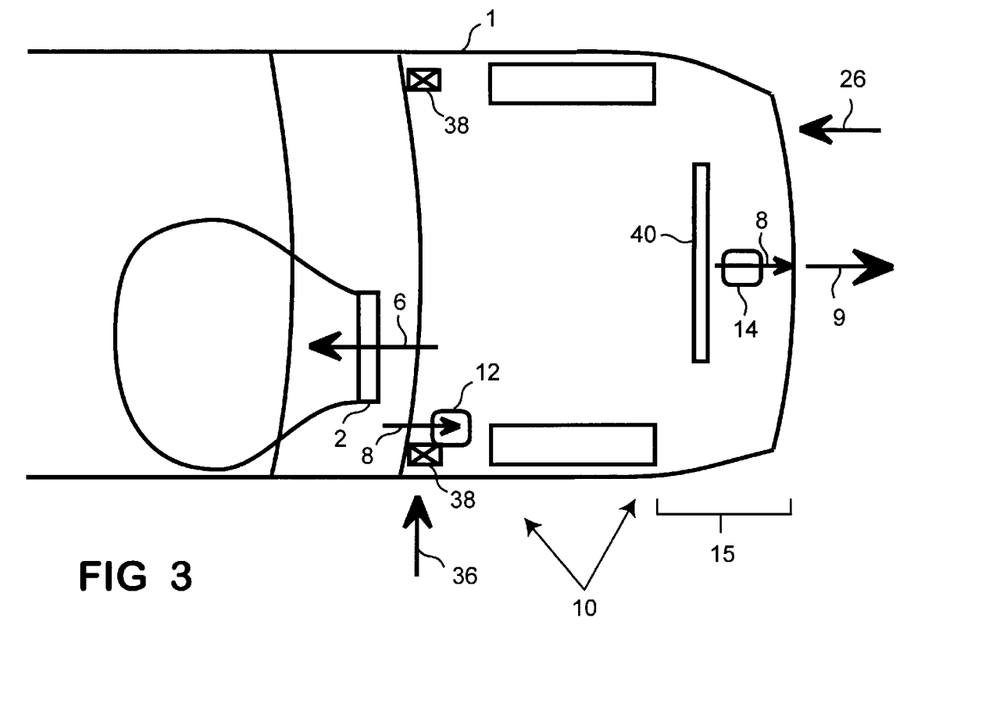
FIG. 3 is a top view of a vehicle of FIG. 2 showing an arrangement of crash sensors for a frontal restraint system according to the instant invention.

Referring to FIGS. 2–3, the instant invention provides a vehicular crash discrimination system 10 having a first crash sensor 12 mounted in a location, such as the right or left cowl (the former of which is illustrated) which is vulnerable to false activation from crashes which are so directed as to preferably require the inactivation of the safety restraint system 2. Ideally the first crash sensor 12 would not be mounted in such a vulnerable mounting location, however, in some cases there is no other choice. Whereas the first crash sensor 12 has a restraint sensing axis 8 aligned with the restraint system axis 6 of the safety restraint system 2, a side impact to the vehicle could cause local deformation of the vehicle structure thereby inducing a false detection of a frontal acceleration signal, such as might occur if the structure to which the first crash sensor 12 was attached was rotated in the course of the crash. A second crash sensor 14 is mounted at a location which is distinct from the first crash sensor 12, and from which location can be sensed substantially all frontal crashes for which the safety restraint system 2 is preferably activated. The second crash sensor 14 is therefore preferably non responsive to crashes which are so directed as to preferably require the inactivation of the safety restraint system 2 and to which the first crash sensor 12 is responsive, and preferably responsive to crashes which are so directed as to preferably require the activation of the safety restraint system 2.

The first crash sensor 12 is preferably an electronic single-point discriminating crash sensor, but most generally any type of discriminating crash sensor. In one aspect of the instant invention, the first crash sensor 12 has a controllable sensing characteristic whereby the set of crashes or crash severity levels which cause the sensor to be triggered can be varied. FIGS. 2 and 3 show this sensor mounted near the underside of the wheel well. The first crash sensor 12 has a first sensing characteristic which discriminates crashes with a sensing characteristic that provides preferable performance for frontal crashes, for example relatively fast detection (i.e. small TTF values), and which is not specifically tuned to be insusceptible to sensor signals generated by a side impact at the location of the single-point module. In the preferred embodiment, this sensing characteristic is implemented by a microprocessor with a suitably programmed algorithm. Such programming is readily understood by one having ordinary skill in the art, as for example illustrated in U.S. Pat. Nos. 5,067,745, 5,282,134, 5,337,238, 5,363,302, 5,365,114, 5,394,326, 5,490,066, 5,498,028, 5,508,918, 5,508,920, 5,519,613, 5,541,842, 5,559,699, 5,563,791, 5,606,501 and 5,629,847. Such programming is also taught in "A New Decision Making Algorithm for Airbag Control" by Syed Masud Mahmud and Ansaf I. Alrabady, *IEEE Transactions on Vehicular Technology*, Vol 44, No. 3, August 1995, pp. 690–697. Furthermore, the specific crash sensing characteristic and associated algorithm are not considered to be limitations of the instant invention.

The second crash sensor 14 is preferably a mechanical discriminating sensor, examples of which include a self-testing electromagnetic sensor, a conventional ball-in-tube type sensor, or a Rolamite (Trademark) sensor. The second crash sensor 14 could also be a crush activated sensor mounted proximal the crush zone 15 of the vehicle 1. More generally, the second crash sensor 14 could be any form of crash sensor, although in one aspect of the instant invention a self-testable sensor is preferred. FIG. 3 shows the second crash sensor 14 mounted in the center-front region of the engine compartment so as to be primarily responsive to frontal crashes. Both the first 12 and second 14 crash sensors are positioned so that their restraint sensing axes 6 are aligned with the longitudinal axis of the vehicle 9, and with the restraint system axis 8 of the associated safety restraint system 2.

In accordance with the instant invention, the second crash sensor 14 can be over-damped, and tuned to close with a pre-defined velocity value, depending upon the crash characteristics of the vehicle structure. The second crash sensor 14 is preferably tuned so that none of the side-impact collision signals, rough-road signals, or undercarriage signals will cause the sensor to close, while some, or all, "threshold-OFF" frontal crash signals will cause the sensor to close. However, it will be appreciated that it is not required that the second crash sensor 14 be kept from closing during "threshold-OFF" crashes, because the second crash sensor 14 is not the system discriminating crash sensor which governs the firing of the air bag. Rather, in accordance with the present invention, firing due to "threshold-OFF" frontal crashes will be suppressed by virtue of the sensing characteristic of the first crash sensor 12.

Figure 4:
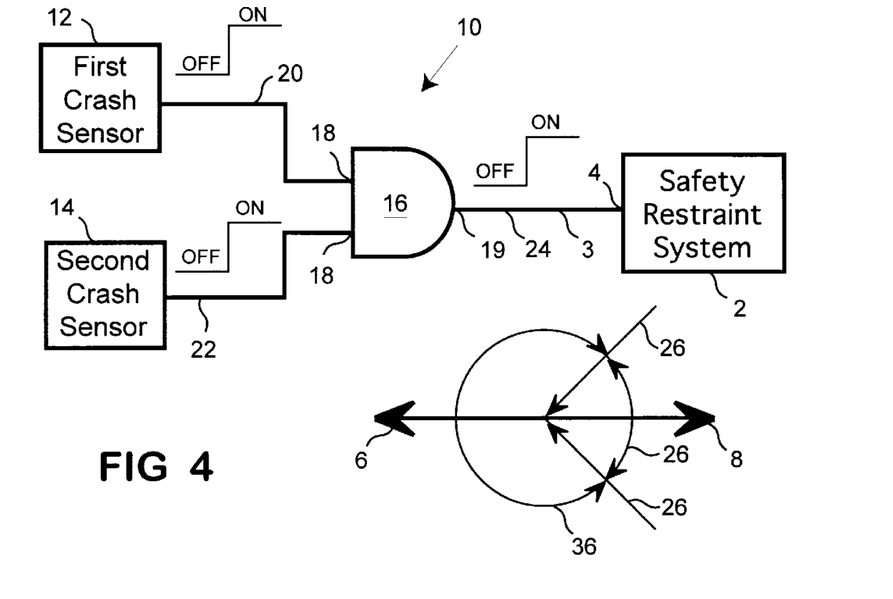
FIG. 4 is a schematic diagram showing the generation of an activation signal from the logical AND combination of the first and second crash sensors.

Referring to FIG. 4, in accordance with one aspect of the instant invention, the first 12 and second 14 crash sensors are each connected to the input terminals 18 of an AND gate 16. The first crash sensor 12 generates a first signal 20 in response to a vehicle crash, whereby the first signal 20 is binary (ON or OFF) with ON representing the activation of the sensor in response to the detection of a crash which might correspond to either a switch closure, a voltage signal, or a current signal. The second crash sensor 14 generates a second signal 22 in response to the same vehicle crash, whereby the second signal 22 is also a binary (ON or OFF) similar to the first signal 20. The AND gate 16 forms at its output terminal 19 a third signal 24 as the logical AND combination of the first 20 and second 22 signals. The output terminal 19 is connected to the activation input signal port 4 of the safety restraint system 2, whereby the third signal 24 is the activation signal 3 of the safety restraint system 2. Therefore, the activation signal 3 necessary to activate the safety restraint system 2 is generated only when both first 12 and second 14 crash sensors generate respective first 20 and second 22 signals each of binary ON value in response to a crash. It will be recognized by one of ordinary skill in the art that the function of the AND gate 16, as well as other logic gates discussed hereinbelow, can be performed by a variety of means, including but not limited to digital circuitry, analog circuitry, relay logic, or by a digital computer or microprocessor. The restraint sensing axes 8 of both first 12 and second 14 crash sensors are aligned with the restraint system axis 6. The second crash sensor 14 is responsive to crashes 26 which are so directed as to preferably require the activation of the safety restraint system 2, but not responsive to crashes 36 to which to first crash sensor 12 might be responsive and which are so directed as to preferably require the inactivation of the safety restraint system.

Since the second crash sensor 14 is calibrated to produce an ON signal for all "threshold-ON" frontal crash events, and possibly also borderline "threshold-OFF" frontal crash events, the vehicular crash discrimination system 10 is effectively "armed" and given the go-ahead to fire the air bag if the first crash sensor 12 detects such activation is warranted. However, even if the second crash sensor 14 arms the vehicular crash discrimination system 10 in response to a "threshold-OFF" event, the first crash sensor 12 sensing characteristic will prevent the firing of the air bag. The first crash sensor 12 is generally activated after the second crash sensor 14 and therefore controls the time-to-fire of the vehicular crash discrimination system 10, and the resulting activation of the safety restraint system 2.

Since the second crash sensor 14 is responsive to crashes 26 which are so directed as to preferably require the activation of the safety restraint system, but not responsive to crashes 36 to which to first crash sensor 12 is responsive and which are so directed as to preferably require the inactivation of the safety restraint system, in the event of rough road event or side impact crash proximate the first crash sensor 12 which might otherwise cause the activation of the first crash sensor 12, the second crash sensor 14 is not activated, thereby preventing the activation of the safety restraint system 2 which might otherwise harm the occupant.

Figure 5:
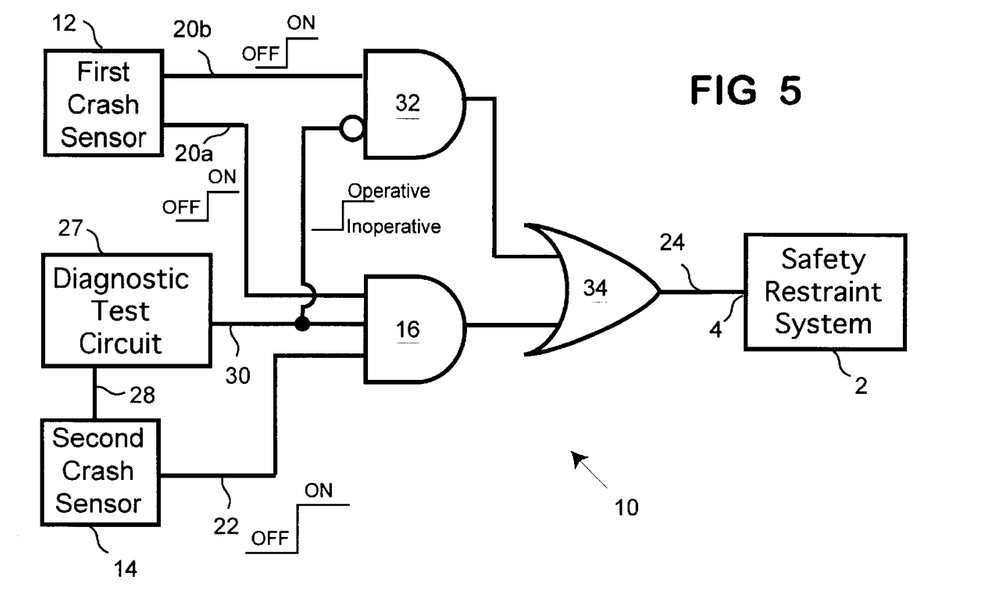
FIG. 5 is a block diagram of an aspect of the instant invention by which the sensing characteristic of the first crash sensor is dependent upon the operative state of the second crash sensor.

Referring to FIG. 5, in accordance with another aspect of the instant invention which provides fault tolerance, the first crash sensor 12 is provided with plurality of sensing characteristics, and the second crash sensor 14 incorporates a self-test means for testing the operability thereof. A diagnostic test circuit 27 operatively coupled to the second crash sensor 14 tests and polls the operability of the second crash sensor 14 via one or more diagnostic test signals 28 and generates a binary signal 30 indicating whether or not the second crash sensor 14 is operative.

The specific configuration of the diagnostic test signals 28 depends upon the nature of the second crash sensor 14. For example, the self-test function may involve the application of a current signal to a coil incorporated into the second crash sensor 14 thereby creating a magnetic force which moves the permanent magnet armature of the sensor causing the sensor switch contacts to close. A subsequent detection of the sensor switch contact closure indicates that the second crash sensor 14 is operative, causing the binary signal 30 to be set to an ON level. Otherwise, binary signal 30 is set to an OFF level.

The first crash sensor 12 generates a signal 20a according to a first sensing characteristic which provides preferable crash detection performance including a fast time-to-fire, but with the associated susceptibility to being responsive to crashes which are so directed as to preferably require the inactivation of the safety restraint system 2. The first crash sensor 12 also generates a signal 20b according to a second sensing characteristic which provides crash detection performance which is not responsive to crashes which are so directed as to preferably require the inactivation of the safety restraint system 2.

In the event that the second crash sensor 14 is operative, AND gate 16 forms the logical AND combination of signals 20a and 22 from the first 12 and second 14 crash sensors which is then passed through OR gate 34 to form a third signal 24 which is operatively coupled to the activation input signal port 4 of the safety restraint system 2. If the second crash sensor 14 is operative, and both the first crash sensor 12 is activated according to a first sensing characteristic and the second crash sensor 14 is activated, the safety restraint system 2 is activated by the third signal 24. If the second crash sensor 14 is operative, and either the first crash sensor 12 is not activated according to a first sensing characteristic or the second crash sensor 14 is not activated, the safety restraint system 2 is remains inactivated. Therefore, should the first crash sensor 12 become activated by a crash which is so directed as to preferably require the inactivation of the safety restraint system 2, the second crash sensor 14 will remain inactivated and will prevent the activation of the safety restraint system 2.

In the event that the second crash sensor 14 is inoperative, signal 20b is passed through AND gate 32 and OR gate 34 to form a third signal 24 which is operatively coupled to the activation input signal port 4 of the safety restraint system 2. If the second crash sensor 14 is inoperative, and the first crash sensor 12 is activated according to a second sensing characteristic, the safety restraint system 2 is activated by the third signal 24. If the second crash sensor 14 is inoperative, and the first crash sensor 12 is not activated, the safety restraint system 2 is remains inactivated. Therefore, in the event of a failure of the second crash sensor 14, the first crash sensor 12 is provided with a second sensing characteristic implemented by an associated crash discrimination algorithm having a set of parameters designed to further discriminate and/or suppress side impacts and rough road events in lieu of the faulty second crash sensor 14, thereby ensuring that the vehicular crash discrimination system 10 can still provide a nominal level of deployment control over the occupant safety restraint device.

Figure 6:
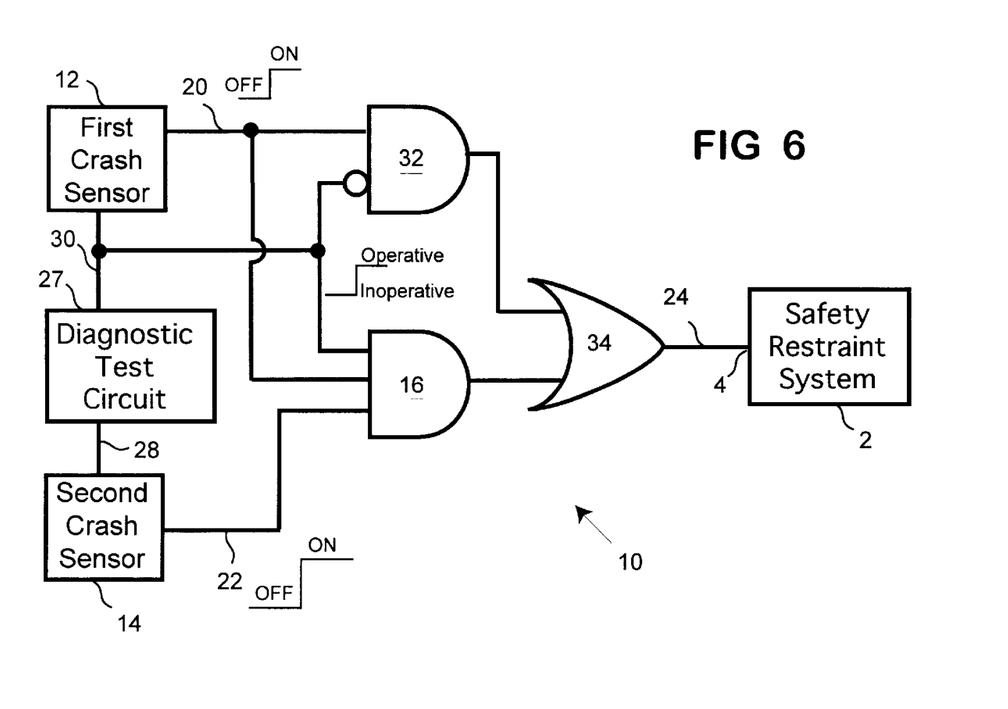
FIG. 6 is a block diagram of another aspect of the instant invention by which the sensing characteristic of the first crash sensor is dependent upon the operative state of the second crash sensor.

Referring to FIG. 6, in accordance with yet another aspect of the instant invention which provides fault tolerance, signal 30 from the diagnostic test circuit 27 is operatively coupled to the first crash sensor 12, whereby first signal 20 generated by the first crash sensor 12 is formed in accordance with a first sensing characteristic providing preferable crash detection characteristics if the second crash sensor 14 is operative; and is formed in accordance with a second sensing characteristic providing immunity to side impacts or rough road events if the second crash sensor 14 is inoperative, but which otherwise might provide suboptimal crash discrimination performance with respect to associated time-to-fire characteristics. The subsequent formulation of the third signal 24 for activating the safety restraint system 2 from the first 20 and second 22 signals is otherwise as described hereinabove.

Figure 7:
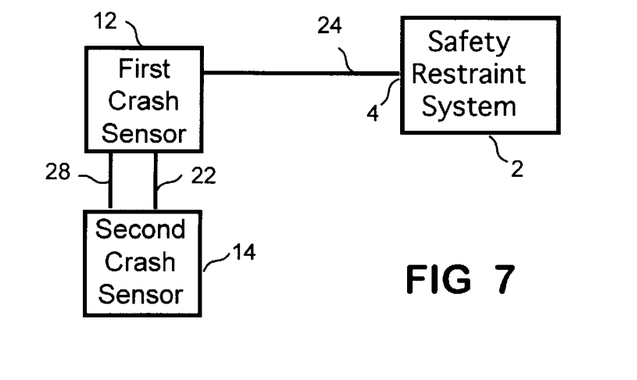
FIG. 7 is a block diagram of an aspect of the instant invention which incorporates diagnostic and logic circuitry into the first crash sensor.

Referring to FIG. 7, in accordance with yet another aspect of the instant invention which provides fault tolerance, the diagnostic test circuit 27 and logic gates 16, 32, and 34 of the FIGS. 5 and 6 embodiments are incorporated in the first crash sensor 12, whereby the first crash sensor 12 tests and polls the operability of the second crash sensor 14 via diagnostic test signals 28, senses the activation of the second crash sensor 14 via a second signal 22, and generates a third signal 24 in accordance with the logic functions described hereinabove in accordance with FIGS. 5 or 6 for activating the safety restraint system 2.

Figure 8:
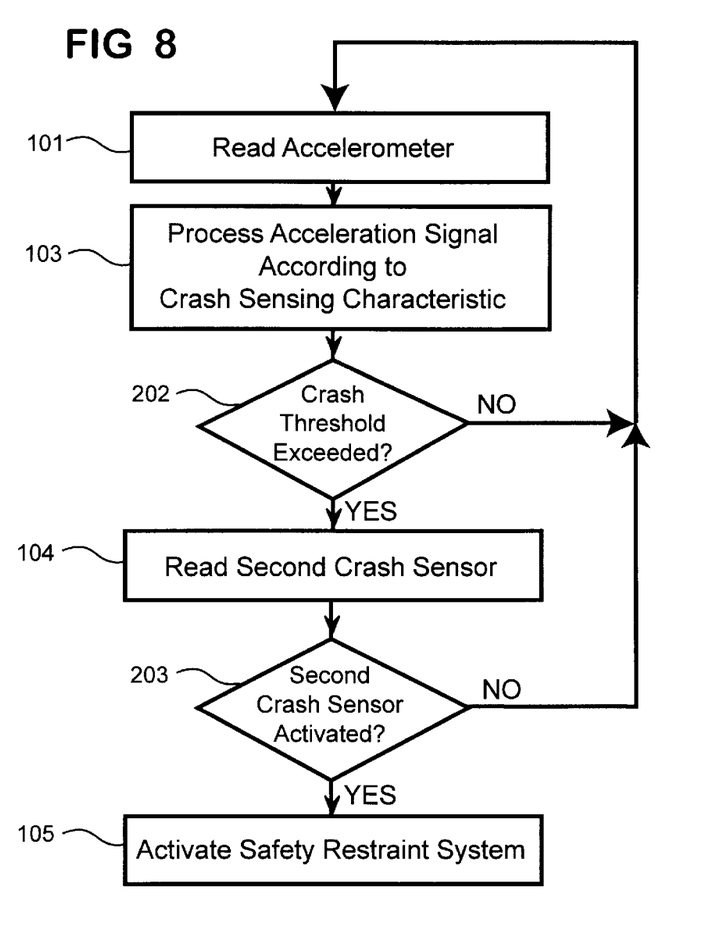
FIG. 8 is a flow chart of one aspect of the instant invention as might be implemented by a microprocessor.

Referring to FIG. 8, in accordance with an aspect of the instant invention as might be implemented by a microprocessor incorporated into the first crash sensor 12, the accelerometer of the first crash sensor 12 is read in step 101 which includes if necessary the step of analog to digital conversion. The resulting acceleration signal is processed according to a crash sensing characteristic by step 103, which has an associated crash threshold for purposes of distinguishing between the activation and non-activation states of the first crash sensor 12. If the crash threshold is determined to be not exceeded in step 202, the steps beginning with step 101 are repeated. If the crash threshold is determined to be exceeded in step 202, the activation state of the second crash sensor 14 is read in step 104, whereby if the second crash sensor 14 is determined to be activated in step 203, the safety restraint system 2 is activated in step 105, otherwise the steps beginning with step 101 are repeated.

Figure 9:
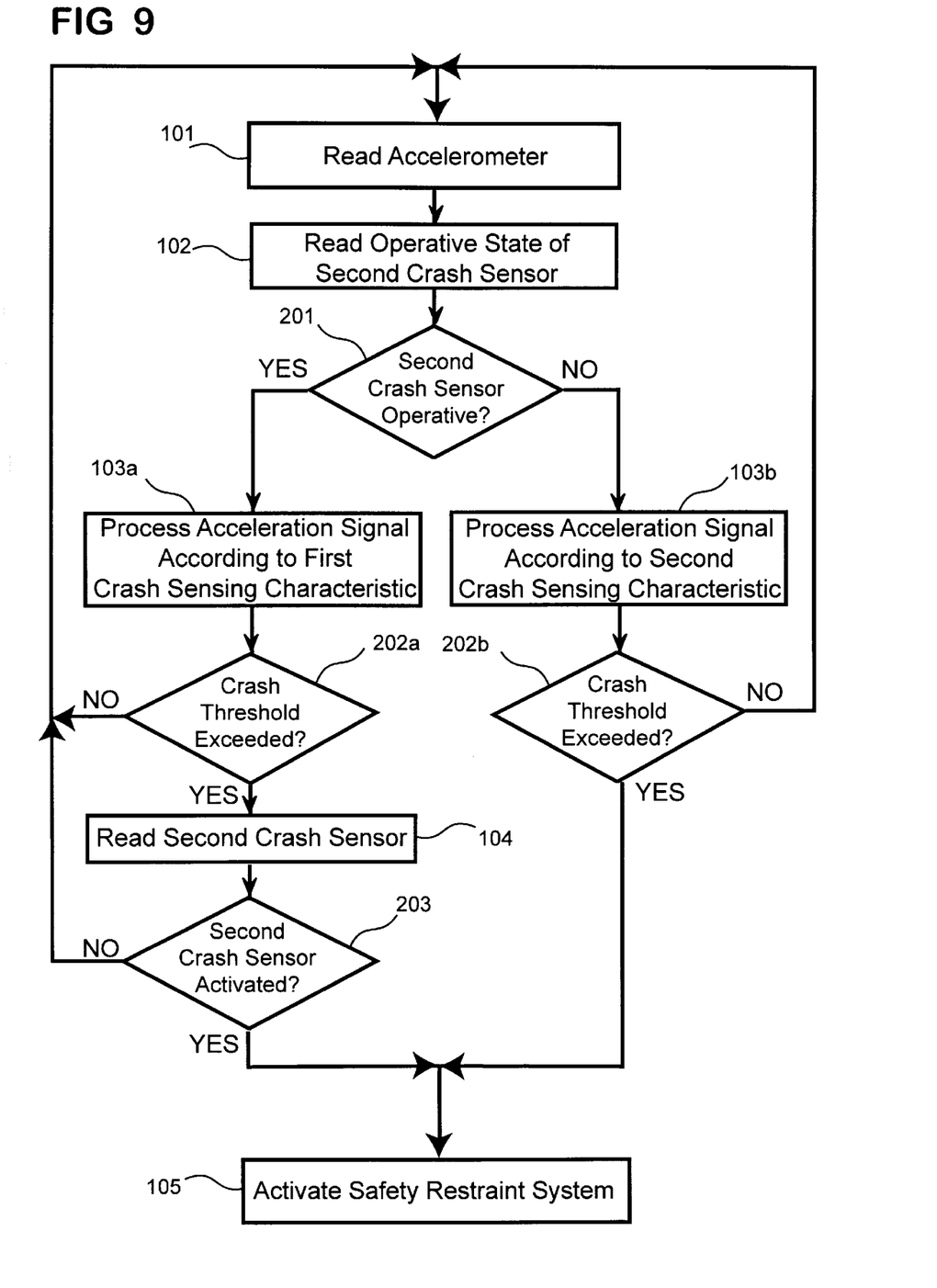
FIG. 9 is a flow chart of another aspect of the instant invention as might be implemented by a microprocessor.

Referring to FIG. 9, in accordance with another aspect of the instant invention as might be implemented by a microprocessor incorporated into the first crash sensor 12, the accelerometer of the first crash sensor 12 is read in step 101 which includes if necessary the step of analog to digital conversion. The operative state of the second crash sensor 14 is read in step 102. If in step 201 the second crash sensor 14 is determined to be operative, the acceleration signal from step 101 is processed according to a first crash sensing characteristic by step 103a, which has an associated crash threshold for purposes of distinguishing between the activation and non-activation states of the first crash sensor 12. If the crash threshold is determined to be not exceeded in step 202a, the steps beginning with step 101 are repeated. If the crash threshold is determined to be exceeded in step 202a, the activation state of the second crash sensor 14 is read in step 104, whereby if the second crash sensor 14 is determined to be activated in step 203, the safety restraint system 2 is activated in step 105, otherwise the steps beginning with step 101 are repeated. If in step 201 the second crash sensor 14 is determined to be inoperative, the acceleration signal from step 101 is processed according to a second crash sensing characteristic by step 103b, which has an associated crash threshold for purposes of distinguishing between the activation and non-activation states of the first crash sensor 12. If the crash threshold is determined to be not exceeded in step 202b, the steps beginning with step 101 are repeated. If the crash threshold is determined to be exceeded in step 202b, the safety restraint system 2 is activated in step 105, otherwise the steps beginning with step 101 are repeated.

Therefore, the instant invention advantageously provides a first crash sensor 12 which performs all crash sensing and time-to-fire computations used in conjunction with a second crash sensor 14 which senses the occurrence of a frontal crash. Such an arrangement allows the first crash sensor 12 to employ an optimal crash sensing characteristic thus providing the best overall safety protection to the driver and passenger while suppressing frontal deployments due to side impacts.

While specific embodiments have been described in detail, it will be appreciated by those with ordinary skill in the art that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

We claim:

1. A vehicular crash discrimination system for controlling the activation of a safety restraint system, comprising:
   a. a first crash sensor which outputs a first signal responsive to a vehicle crash, wherein said first crash sensor has a restraint sensing axis and said first crash sensor operates in accordance with a sensing characteristic, whereby the location of said first crash sensor is such that said first crash sensor is susceptible to being activated responsive to a first type of said vehicle crash having a direction for which the safety restraint system should remain inactivated;
   b. a second crash sensor which outputs a second signal responsive to said vehicle crash, wherein said second crash sensor has a restraint sensing axis and the restraint sensing axis of said first crash sensor is in substantially the same direction as the restraint sensing axis of said second crash sensor, said second crash sensor operates in accordance with a sensing characteristic, and said second crash sensor is at a distinct location relative to said first crash sensor, whereby said second crash sensor is not activated responsive to said first type of said vehicle crash, and said second crash sensor is activated responsive to a second type of said vehicle crash having a direction for which the safety restraint system should be activated; and
   c. a means operatively coupled to said first and second crash sensors for forming a third signal which controls the activation of the safety restraint system, whereby said third signal is a logical AND combination of said first and second signals, and responsive to said second type of said vehicle crash said first crash sensor controls the activation of the safety restraint system.

2. A vehicular crash discrimination system for controlling the activation of a safety restraint system as recited in claim 1, wherein said sensing characteristic of said first crash sensor has a higher threshold than said sensing characteristic of said second crash sensor for said second type of said vehicle crash.

3. A vehicular crash discrimination system for controlling the activation of a safety restraint system as recited in claim 1, wherein the vehicular crash discrimination system is in a vehicle having a vehicle crush zone and said second crash sensor is proximal to said vehicle crush zone.

4. A vehicular crash discrimination system for controlling the activation of a safety restraint system as recited in claim 3, wherein said sensing characteristic of said first crash sensor has a higher threshold than said sensing characteristic of said second crash sensor for said second type of said vehicle crash.

5. A method of detecting a vehicle crash for controlling the activation of a safety restraint system, comprising:
   a. sensing the vehicle crash with a first crash sensor to generate a first signal, wherein said first crash sensor has a restraint sensing axis and said first crash sensor operates in accordance with a sensing characteristic, whereby the location of said first crash sensor is such that said first crash sensor is susceptible to being activated responsive to a first type of said vehicle crash having a direction for which the safety restraint system should remain inactivated;
   b. sensing the vehicle crash with a second crash sensor to generate a second signal, wherein said second crash sensor has a restraint sensing axis and the restraint sensing axis of said first crash sensor is in substantially the same direction as the restraint sensing axis of said second crash sensor and said second crash sensor operates in accordance with a sensing characteristic, and said second crash sensor is at a distinct location relative to said first crash sensor, whereby said second crash sensor is not activated responsive to said first type of said vehicle crash, and said second crash sensor is activated responsive to a second type of said vehicle crash having a direction for which the safety restraint system should be activated; and
   c. forming a third signal which controls the activation of the safety restraint system, whereby said third signal is a logical AND combination of said first and second signals, and responsive to said second type of said vehicle crash said first crash sensor controls the activation of the safety restraint system.

6. A method of detecting a vehicle crash for controlling the activation of a safety restraint system as recited in claim 5, wherein said sensing characteristic of said first crash sensor has a higher threshold than said sensing characteristic of said second crash sensor for said second type of said vehicle crash.

7. A method of detecting a vehicle crash for controlling the activation of a safety restraint system as recited in claim 5, wherein the method of detecting a vehicle crash is performed in a vehicle having a vehicle crush zone and said second crash sensor is proximal to said vehicle crush zone.

8. A method of detecting a vehicle crash for controlling the activation of a safety restraint system as recited in claim 7, wherein said sensing characteristic of said first crash sensor has a higher threshold than said sensing characteristic of said second crash sensor for said second type of said vehicle crash.

9. A vehicular crash discrimination system for controlling the activation of a safety restraint system, comprising:
   a. a first crash sensor which outputs a first signal responsive to a vehicle crash, wherein said first crash sensor has a restraint sensing axis;
   b. a second crash sensor which outputs a second signal responsive to said vehicle crash, wherein said second crash sensor has a restraint sensing axis and the restraint sensing axis of said first crash sensor is in substantially the same direction as the restraint sensing axis of said second crash sensor, said second crash sensor operates in accordance with a sensing characteristic and said second crash sensor is at a distinct location relative to said first crash sensor;
   c. a means for sensing the operative state of said second crash sensor; and
   d. a means operatively coupled to said first and second crash sensors for forming a third signal which controls the activation of the safety restraint system, whereby said first crash sensor operates in accordance with a sensing characteristic dependent upon the operative state of said second crash sensor, said first crash sensor operates in accordance with a first sensing characteristic and said third signal is a logical AND combination of said first and second signals if said second crash sensor is operative, said first crash sensor operates in accordance with a second sensing characteristic and said third signal is set substantially equal to said first signal if said second crash sensor is inoperative, and said sensing characteristic of said first crash sensor has a higher threshold than said sensing characteristic of said second crash sensor for said vehicle crash having a direction for which the safety restraint system should be activated.

10. A vehicular crash discrimination system for controlling the activation of a safety restraint system as recited in claim 9, wherein said second crash sensor is not activated responsive to said vehicle crash having a direction for which the safety restraint system should remain inactivated.

11. A vehicular crash discrimination system for controlling the activation of a safety restraint system as recited in claim 9, wherein the vehicular crash discrimination system is in a vehicle having a vehicle crush zone and said second crash sensor is proximal to said vehicle crush zone.

12. A vehicular crash discrimination system for controlling the activation of a safety restraint system as recited in claim 11, wherein said second crash sensor is not activated responsive to said vehicle crash having a direction for which the safety restraint system should remain inactivated.

13. A vehicular crash discrimination system for controlling the activation of a safety restraint system as recited in claim 9, wherein said second sensing characteristic has a higher threshold than said first sensing characteristic.

14. A vehicular crash discrimination system for controlling the activation of a safety restraint system as recited in claim 13, wherein said second crash sensor is not activated responsive to said vehicle crash having a direction for which the safety restraint system should remain inactivated.

15. A vehicular crash discrimination system for controlling the activation of a safety restraint system as recited in claim 14, wherein the vehicular crash discrimination system is in a vehicle having a vehicle crush zone and said second crash sensor is proximal to said vehicle crush zone.

16. A vehicular crash discrimination system for controlling the activation of a safety restraint system as recited in claim 15, wherein said second crash sensor is not activated responsive to said vehicle crash having a direction for which the safety restraint system should remain inactivated.

17. A vehicular crash discrimination system which utilizes crash and diagnostic signals from a second crash sensor and generates a signal for controlling the activation of a safety restraint system, comprising:
   a. a first crash sensor which outputs a first signal responsive to a vehicle crash, wherein said first crash sensor has a restraint sensing axis; and
   b. a means operatively coupled to said first crash sensor and to the signal from the second crash sensor for forming a third signal which controls the activation of the safety restraint system, wherein the second crash sensor has a restraint sensing axis and the restraint sensing axis of said first crash sensor is in substantially the same direction as the restraint sensing axis of said second crash sensor, whereby said first crash sensor operates in accordance with a sensing characteristic dependent upon the operative state of the second crash sensor, said first crash sensor operates in accordance with a first sensing characteristic and said third signal is a logical AND combination of said first signal and the second signal if the second crash sensor is operative, and said first crash sensor operates in accordance with a second sensing characteristic and said third signal is set substantially equal to said first signal if the second crash sensor is inoperative.

18. A vehicular crash discrimination system which utilizes crash and diagnostic signals from a second crash sensor and generates a signal for controlling the activation of a safety restraint system, as recited in claim 17, wherein said second sensing characteristic has a higher threshold than said first sensing characteristic.

19. A method of detecting a vehicle crash for activating a safety restraint system, comprising:
   a. sensing the vehicle crash with a first crash sensor to generate a first signal, wherein said first crash sensor has a restraint sensing axis;
   b. sensing the vehicle crash with a second crash sensor to generate a second signal, wherein said second crash sensor has a restraint sensing axis and the restraint sensing axis of said first crash sensor is in substantially the same direction as the restraint sensing axis of said second crash sensor and said second crash sensor is at a distinct location relative to said first crash sensor;
   c. sensing the operative state of said second crash sensor; and
   d. forming a third signal which controls the activation of the safety restraint system, whereby said first crash sensor operates in accordance with a sensing characteristic dependent upon the operative state of said second crash sensor, said first crash sensor operates in accordance with a first sensing characteristic and said third signal is a logical AND combination of said first and second signals if said second crash sensor is operative, said first crash sensor operates in accordance with a second sensing characteristic and said third signal is set substantially equal to said first signal if said second crash sensor is inoperative, and said sensing characteristic of said first crash sensor has a higher threshold than said sensing characteristic of said second crash sensor for the vehicle crash having a direction for which the safety restraint system should be activated.

20. A method of detecting a vehicle crash for controlling the activation of a safety restraint system as recited in claim 19, wherein said second crash sensor is not activated responsive to the vehicle crash having a direction for which the safety restraint system should remain inactivated.

21. A method of detecting a vehicle crash for controlling the activation of a safety restraint system as recited in claim 19, wherein the method of detecting a vehicle crash is performed in a vehicle having a vehicle crush zone and said second crash sensor is proximal to said vehicle crush zone.

22. A method of detecting a vehicle crash for controlling the activation of a safety restraint system as recited in claim 21, wherein said second crash sensor is not activated responsive to the vehicle crash having a direction for which the safety restraint system should remain inactivated.

23. A method of detecting a vehicle crash for controlling the activation of a safety restraint system as recited in claim 19, wherein said second sensing characteristic has a higher threshold than said first sensing characteristic.

24. A method of detecting a vehicle crash for controlling the activation of a safety restraint system as recited in claim 23, wherein said second crash sensor is not activated responsive to the vehicle crash having a direction for which the safety restraint system should remain inactivated.

25. A method of detecting a vehicle crash for controlling the activation of a safety restraint system as recited in claim 23, wherein the method of detecting a vehicle crash is performed in a vehicle having a vehicle crush zone and said second crash sensor is proximal to said vehicle crush zone.

26. A method of detecting a vehicle crash for controlling the activation of a safety restraint system as recited in claim 25, wherein said second crash sensor is not activated responsive to the vehicle crash having a direction for which the safety restraint system should remain inactivated.

* * * * *